Aug. 10, 1937.  S. ENGLISH  2,089,693

LUMINAIR

Filed Dec. 13, 1934  2 Sheets-Sheet 1

INVENTOR.
Solomon English
BY
ATTORNEY.

Aug. 10, 1937.　　　　S. ENGLISH　　　2,089,693
LUMINAIR
Filed Dec. 13, 1934　　　2 Sheets-Sheet 2
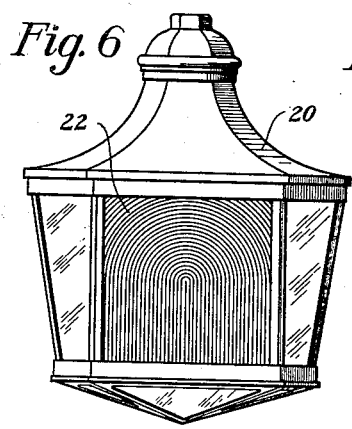
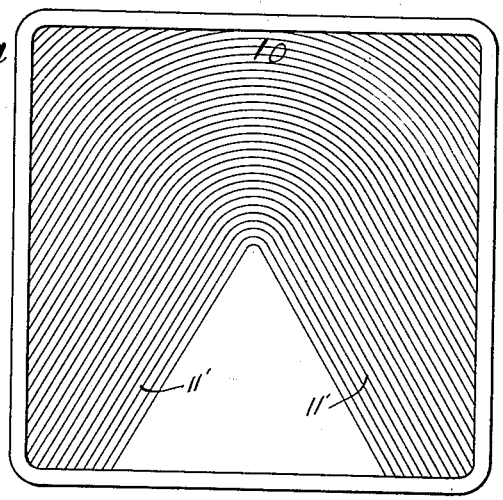
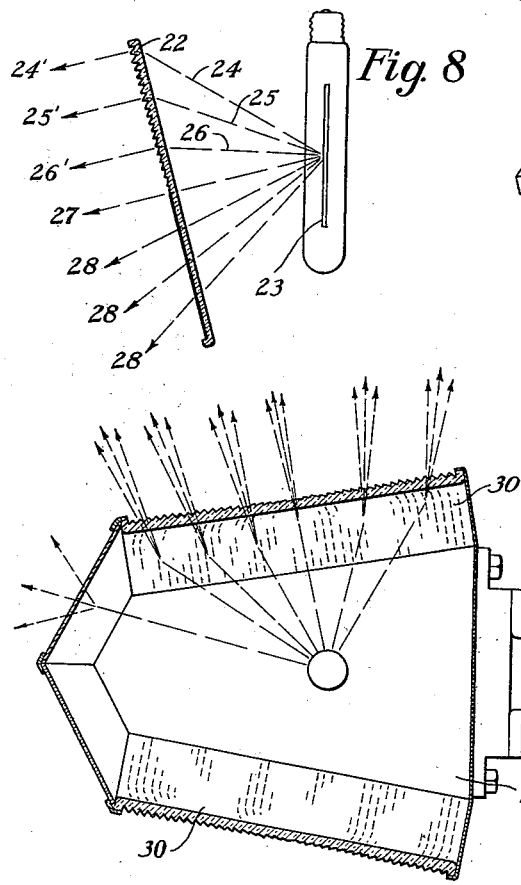
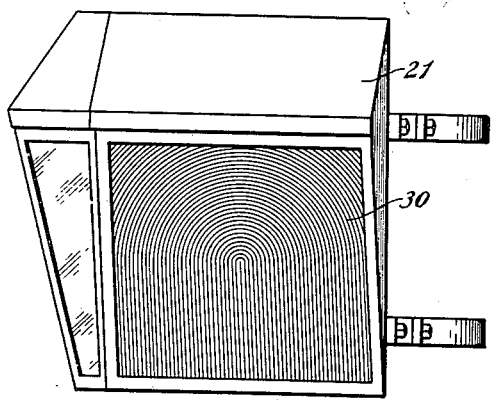
INVENTOR.
Solomon English
BY
ATTORNEY.

Patented Aug. 10, 1937

2,089,693

UNITED STATES PATENT OFFICE 2,089,693

LUMINAIR

Solomon English, London, England, assignor to Holophane Company, Inc., New York, N. Y., a corporation of Delaware Application December 13, 1934, Serial No. 757,295
In Great Britain December 20, 1933

6 Claims. (Cl. 240—25)

The present invention relates to luminairs for street lighting, and other purposes and to lenses for use therein.

These luminairs and lenses are particularly designed to employ long light sources, such as electrical discharge tubes, tubular lamps or a row of point light sources.

In efficient street lighting, it is necessary to collect light that is emitted in an upward direction, and so redirect it in both vertical and horizontal directions as to bring it into the direction of the roadway and down on to the road surface at some predetermined distance from the foot of the lamp post, but light that is already emitted at suitable angles below the horizontal, needs no redirection in the vertical plane, but only redirection into the direction in which it is desired to project the light. Similarly in the lighting of shop windows from concentrating plates in false ceilings, it is necessary to collect the light that would normally pass out through the window and redirect it on to the goods on show, and also to collect light that is emitted sideways and redirect it downwards, but it is not necessary to redirect light that is emitted towards the goods on show; concentration in a lateral sense is all that is necessary with such light.

The present invention is designed to meet these requirements and contemplates the provision of a lens plate in which one portion carries concentric prismatic arcs of such a shape and strength as to form a stepped lens while the other portion carries parallel straight or sinuous prisms designed to concentrate light received by them from a suitably placed source.

The long light source is preferably disposed at the focus of the parallel lens prisms so that they concentrate light into a beam of limited spread. The concentric prisms have a focal point substantially at the end of the light source and reduce its spread in longitudinal planes.

The accompanying drawings show, for purposes of illustrating the present invention, several embodiments in which the invention may take form, it being understood that the drawings are illustrative of the invention rather than limiting the same. In these drawings:

Fig. 4a shows a further alternative form of lens;

Figs. 6 and 7 are side elevational views of built up lanterns for street lighting employing the plate of Figures 1–3;

Fig. 8 is a diagrammatic vertical sectional view through the light source and lens of the lantern of Figure 6; and Fig. 9 is a horizontal sectional view of the lantern of Figure 7.

Figure 1:
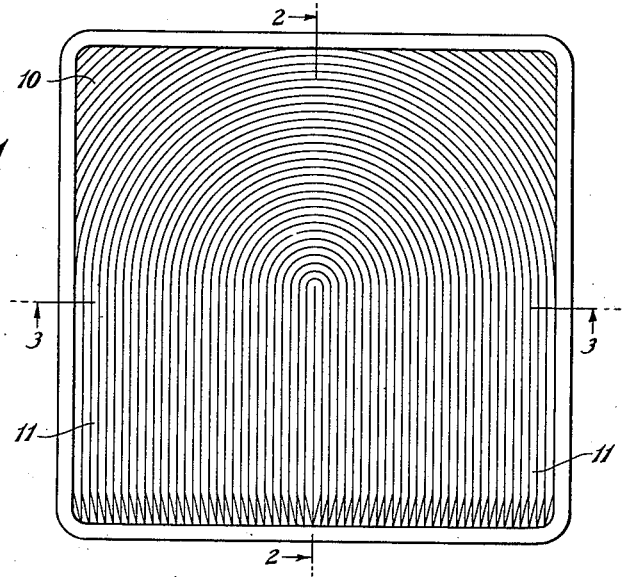
Fig. 1 shows a front view of a lens plate.
Figure 2:
Fig. 2 shows a vertical section on the line 2—2 of Figure 1.
Figure 3:
Fig. 3 shows a transverse section on the line 3—3 of Figure 1.

Referring now to Figures 1–3 of the drawings the upper part of the lens plate is provided with a series of concentric prismatic arcs 10 shaped as shown in Figure 2 to form a stepped lens. The arcuate section of the lens may, with advantage, occupy one half or the complete lens plate, as shown in the drawings, but this is not necessary—it may be more or less, as desired.

The series of vertical prisms 11 which form the lower part of the lens plate may have prism angles as shown in Figure 3, with the same angles as the angles of the arcuate prisms into which they merge, but here again, it is not essential that they should be.

Figure 4:
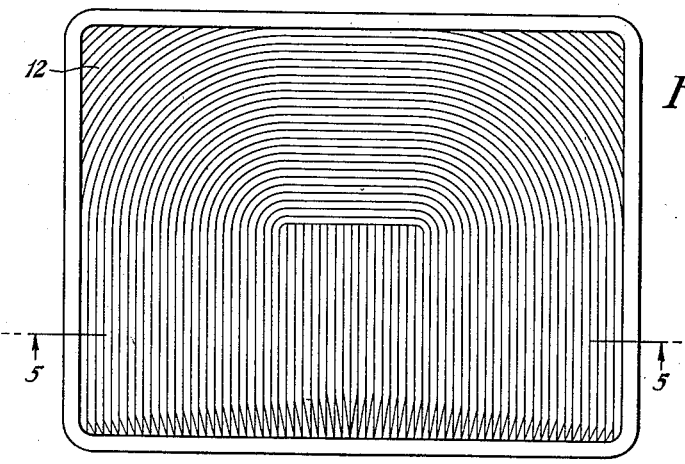
Fig. 4 shows a front view of an alternative form of lens plate.
Figure 5:
Fig. 5 shows a transverse section on the line 5—5 of Figure 4.

In the alternative form of lens plate shown in Figures 4 and 5 the series of concentric prismatic arcs 12 are flattened. Such a plate may be suitably employed when the width of the plate is substantially greater than its height.

As shown in Figures 1 and 4 the lower portions of the parallel prisms are preferably run-out or tapered so as to give a region of less concentration near the bottom of the plate. This allows the light which is proceeding rapidly towards the road surface to cover the whole of the roadway and not to be concentrated in a narrow area. The run-out or taper may be uniform across the whole width of the plate as shown in Fig. 1, or it may with advantage, be greater near the centre of the plate as shown in Fig. 4.

Another alternative form of lens plate is shown in 4a. In this case the parallel prisms 11' are in two diagonal banks arranged symmetrically about the central vertical axis. This plate may have a blank space or a diffusing space in the central lower portion as shown. Such a plate when mounted over the centre of a roadway tends to confine the light within the two parallel edges of the road.

Where these plates are to be employed in street lighting lanterns they are mounted in a suitably shaped lantern body such for example as shown at 20 of Figure 6 or 21 of Figure 7.

The lantern of Figure 6 is more especially designed to be placed over the center of a roadway or an intersection and is provided with two or more lens panels 22 such as shown in the preceding figures. The light source 23 is vertical and the lens plate 22 is tilted inwardly at the bottom as indicated. The path of typical rays in the vertical plane are indicated in Figure 8. The divergent light indicated by rays 24, 25 and 26 which strike the concentric lenses of the plate 22 is bent downwardly as indicated at 24', 25' and 26' and is condensed in horizontal planes as previously described. The center of the light source is preferably placed approximately in the axial line 27 of the concentric prisms. The light which passes from the light source through the parallel prisms is indicated at 28. The path of these rays is not changed in the vertical plane, but they are condensed in horizontal planes as previously described. The tilting of the plate is at an angle of 10° to 15° so that the emitted light is normal to the surface of the plate and at the proper angle for illuminating the road surface. The other side panels and the bottom of the lamp may be of suitable diffusing glass.

The lantern 21 of Figures 7 and 9 is designed for mounting at the side of the street. In this lantern the plates 30 are tilted in the same way as the plates 22 of Figure 8 and set at an angle to each other as is apparent in Figure 9 so that they light in what may be termed as a V-shaped formation. The paths of the light rays in a horizontal plane are indicated in Figure 9 which shows that the light will be emitted in two beams slightly less than 180° to one another so as to provide the desired lighting lengthwise of the street.

It will be apparent from the foregoing that the concentric condensing lenses at the upper part of the plate in these street lighting lanterns act on the upwardly emitted light between two vertical planes so as to condense that light into a narrow angle measured horizontally and to lower the vertical angle of the emitted light so that substantially all the light transmitted from the concentric prisms is placed on remote parts of the road surface.

Where the plates shown herein are to be employed for lighting horizontal areas substantially underneath the light source such for example as in show windows, the lens plate is placed horizontal and the light source horizontal above the plate.

It is apparent that, within the scope of the invention, modifications and different arrangements may be made other than is herein disclosed, and the present disclosure is illustrative merely, the invention comprehending all variations thereof.

What is claimed is:

1. In combination, a lens plate having a plurality of concentric prisms and a plurality of straight parallel prisms extending from the ends of the concentric prisms, the plate being symmetrical about a line midway of the parallel prisms, and a long light source opposite the adjacent ends of the concentric and straight prisms, the concentric prisms reducing the lateral and horizontal spread of the light transmitted thereby and the straight prisms reducing the lateral spread of the light transmitted thereby, the light source being in a vertical plane and the concentric prisms above the upper end of the source for lowering the angle of the upwardly emitted light.

2. In combination, a flat, tilted lens plate having a plurality of concentric prisms and a plurality of straight parallel prisms extending downwardly from the ends of the concentric prisms, the plate being symmetrical about a line midway of the parallel prisms, and a long light source parallel with the line of symmetry and with its center opposite the adjacent ends of the concentric and straight prisms, the cencentric prisms reducing the lateral and longitudinal spread of the light transmitted thereby so that the portion of the light emitted thereby is normal to the plane of the plate and the straight prisms reducing the lateral spread of the light transmitted thereby without deviation in vertical planes.

3. A luminair having a long light source, a lens plate having a series of substantially parallel prisms having a focal line substantially coincident with the light source for concentrating the transversely divergent light incident thereon into a less divergent beam, and a series of concentric light concentrating prisms having a focal point in the region of the center of the source and extending through 180° about the axis of the prisms for condensing the divergent light falling thereon into a less divergent beam proceeding in the same general direction as the rays from the parallel prisms.

4. A street lighting luminair comprising a vertical long light source, and a plurality of flat tilted lens plates each having prisms acting on upwardly emitted light in a predetermined horizontal angle to direct it below the horizontal and concentrate it into a narrower horizontal angle, the light being emitted substantially normal to the planes of the plates, and vertically extending prisms acting on downwardly emitted light in said horizontal angle for concentrating it into a narrower horizontal angle without deviation in vertical planes.

5. A lens plate in which one portion carries concentric prismatic arcs of such a shape and strength as to form a stepped, concentrating lens while another portion carries parallel substantially straight prisms designed to concentrate light, the side edges of the plate being parallel with the straight prisms, the lower portions of the parallel prisms being run-out so as to give a region of less concentration near the bottom of the plate.

6. A lens plate as claimed in claim 5, wherein the run-out is greater near the center of the plate.

SOLOMON ENGLISH.